United States Patent [19]

Stang

[11] 4,311,409
[45] Jan. 19, 1982

[54] WET POWDER SEAL FOR GAS CONTAINMENT

[75] Inventor: Louis G. Stang, Sayville, N.Y.

[73] Assignee: The United States of America as represented by the United States Department of Energy, Washington, D.C.

[21] Appl. No.: 70,547

[22] Filed: Aug. 29, 1979

[51] Int. Cl.³ .............................................. E02D 3/14
[52] U.S. Cl. .................................... 405/52; 405/154; 405/57; 138/97
[58] Field of Search .......................... 405/154, 52–58, 405/36, 129; 52/169.5; 138/97; 264/30, 35, 36

[56] References Cited

U.S. PATENT DOCUMENTS

| | | | |
|---|---|---|---|
| 997,835 | 7/1911 | Lane | 52/169.5 |
| 2,437,909 | 3/1948 | Cooper | 405/53 X |
| 2,917,085 | 12/1959 | Douse | 166/285 X |
| 3,123,101 | 3/1964 | Blount et al. | 138/97 |
| 3,352,116 | 11/1967 | Waterman | 405/53 |
| 3,407,552 | 10/1968 | Cassidy | 52/169.5 |
| 3,438,204 | 4/1969 | Cleary | 405/53 X |
| 3,465,527 | 9/1969 | Rohmer | 405/53 |
| 3,732,697 | 5/1973 | Dickson | 405/129 |
| 4,062,195 | 12/1977 | Brewer et al. | 405/154 |
| 4,068,488 | 1/1978 | Ball | 405/154 |
| 4,166,709 | 9/1979 | Valiga | 405/55 X |
| 4,167,087 | 9/1979 | Schabert et al. | 52/169.5 X |
| 4,192,629 | 3/1980 | Hallenius et al. | 405/128 |
| 4,222,975 | 9/1980 | Kirschke | 405/267 |

Primary Examiner—Dennis L. Taylor
Attorney, Agent, or Firm—Cornell D. Cornish; Leonard Belkin; James E. Denny

[57] ABSTRACT

A gas seal is formed by a compact layer of an insoluble powder and liquid filling the fine interstices of that layer. The smaller the particle size of the selected powder, such as sand or talc, the finer will be the interstices or capillary spaces in the layer and the greater will be the resulting sealing capacity, i.e., the gas pressure differential which the wet powder layer can withstand. Such wet powder seal is useful in constructing underground gas reservoirs or storage cavities for nuclear wastes as well as stopping leaks in gas mains buried under ground or situated under water. The sealing capacity of the wet powder seal can be augmented by the hydrostatic head of a liquid body established over the seal.

10 Claims, 2 Drawing Figures

WET POWDER SEAL FOR GAS CONTAINMENT

BACKGROUND OF THE INVENTION

The invention described herein was made or conceived in the course of, or under a contract with, the U.S. Department of Energy.

The problem of confining a gas in underground structures is encountered in various forms. A buried gas pipeline or holder may develop a leak because of corrosion or rupture resulting from ground settlement or earthquake. Such a gas leak obviously requires the application of a seal. There is also a need to construct low-cost underground gas reservoirs and storage cavities for isolating nuclear waste. Such buried formations should preferably be made fail-safe against gas leakage from the occurrence of ground movements or earthquakes. Similarly, it is desirable to bury gas pipelines in trenches that can provide a sealing sheath against the escape of gas in the event that the pipe develops a fracture or a joint springs a leak.

The foregoing illustrative problems of underground gas structures that require sealing repairs when a leak develops or that are made fail-safe against gas leakage when they are constructed have elicited numerous proposals for diverse solutions. For example, U.S. Pat. No. 2,917,085 to Douse discloses the use of jetting devices to create a cavity around the leak in a buried pipe; the cavity is then filled by pumping cement into it. U.S. Pat. No. 3,084,179 to Wallace et al. proposes the remote application of a sealant to a leak in an underground pipe by drilling through the soil to a point near the leak, pumping oil to that point under pressure to crack the soil and then pumping an asphalt emulsion into the loosened soil to surround and seal the leak in the pipe.

Other suggestions for stopping leaks in buried structures have involved the application of a sealant from within the structure. Thus, Hilbush, Jr., teaches in U.S. Pat. No. 3,287,148 the sealing of leaks in a gas main by introducing a foamed sealant into the main. The foamed sealant is carried downstream by the gas flow and is dispersed over the inner surface of the main. As the foam breaks, the liquid sealant collects to form a coating on the inner surface of the main which plugs leaks. According to U.S. Pat. No. 3,727,412, Marx et al. block off the portion of a buried conduit which has a break or leak and inject a surfactant-stabilized latex emulsion into the blocked off portion under pressure in order to penetrate the soil adjacent to the leak. The emulsion is formulated to break after the desired penetration of the soil and thus form a seal on the exterior of the conduit.

The cited proposals for stopping leaks in underground structures are illustrative of not only the diversity but also the complexity of many prior remedial measures.

Accordingly, a principal object of this invention is to provide a method for making a simple and easily formed seal for confining gas in underground structures.

Another object is to utilize readily available and inexpensive materials in forming such a gas seal.

A further object is to provide an underground gas storage structure that is not ruptured by ground settlement or even an earthquake.

These and other objects and advantages of the invention will be evident from the description which follows.

SUMMARY OF THE INVENTION

In accordance with this invention, a gas seal is formed by providing a compact layer of an insoluble powder and liquid filling the fine interstices of that layer. This amazingly simple and effective method of making a gas seal is based on the discovery that the tiny interstices of the dense layer of powder act individually as capillaries, i.e., tubes of fine bore.

As known, when a long capillary, open at both ends, is held vertically with the lower end immersed in a liquid, the liquid will be drawn up through the capillary by the surface tension of the liquid. The height to which the liquid will rise is directly related to the surface tension of that liquid and inversely related to the bore diameter of the capillary and the density of the liquid. The surface tension of the liquid decreases with increasing temperature. For instance, a given capillary is capable of drawing water up 85 centimeters (cm), measured from the surface of the water into which the lower end of the capillary is immersed. When one end of such capillary containing water is connected to a gas holder and the other end is open to the atmosphere, the capillary will act as a seal against the escape of gas from the holder so long as the gas pressure within the holder does not exceed the atmospheric pressure plus an amount corresponding to a column of water 85 cm in height. Hence, the illustrative capillary containing water is capable of maintaining a pressure differential equivalent to a water column of 85 cm. It is well to remember that the same capillary even when shortened to a stubby fraction of a cm will still permit a pressure differential between the gas in the holder and the atmosphere equal to a water column of 85 cm. Moreover, the shortened or stubby capillary need not be connected vertically to the top of the gas holder to act as a seal against a maximum gas pressure equal to a water column of 85 cm; the stubby capillary may be connected horizontally to a side of the gas holder or it may be connected to the bottom and still act as a seal effective up to a maximum gas pressure differential equal to a water column of 85 cm. The foregoing discussion of a capillary tube is a review of physics intended solely to facilitate understanding of the wet powder seal of this invention used for gas containment.

The layer of wet powder used pursuant to this invention as a gas seal will withstand a maximum pressure differential which is made possible and limited by the largest interstice or "bore" in the wet powder layer. Hence, as the particle size of the powder decreases, the size of the interstices in a compact layer of the powder decreases and the resulting maximum gas pressure differential of the wet layer increases. Thus, a compact layer of cadmium powder passing through U.S. Sieve No. 100 and retained on Sieve No. 200, when wet by water, was found to sustain a maximum gas pressure differential equal to a water column of 39.8 cm, while a wet layer of glass-shot passing through U.S. Sieve No. 140 and retained on Sieve No. 270 permitted a maximum pressure differential equal to a water column of 97.2 cm. It should be kept in mind that the illustrative wet layer of cadmium powder does not have to be 39.8 cm in thickness to provide its maximum pressure differential. Theoretically, that wet layer can be as thin as a single cadmium particle and still resist the aforesaid maximum pressure differential provided that the largest interstice of "bore" in the single layer of contiguous cadmium particles is no larger than the largest interstice in the most closely-packed single particle-thick layer of contiguous particles found in a thick layer of those cadmium particles. In practice, the wet powder layer is made hundreds or thousands of particles thick to minimize the chance of an interstice being larger than it should be because some particles were not in contact with one another or were in contact but not in a closely-packed configuration and to ensure that the pressure differential of the wet powder layer will not be lost even if the layer undergoes some deformation resulting from soil movement or earthquake. Hence, in many cases it is advisable to make the wet powder layer at least about 10 cm thick. Frequently, the thickness of the wet powder layer will be 30 cm or more.

Any insoluble and inert solid material in powder form may be used to form the gas seal of this invention. Fine sand, fly-ash and pulverized minerals and glasses are often available at low cost. Talc and zircon are illustrative of minerals that are pulverized to a flour passing through U.S. Sieve No. 325. Pigments, powdered metals, and coal dust may be used. Clearly, the smaller the particle size of the material selected, the greater will be the maximum gas pressure differential attained by the wet powder layer. The selected material should be wettable by the liquid, usually water, used to form the gas seal. It is important that the liquid and the solid be each of a type such that the liquid will wet the solid if the two are brought into contact. It is not necessary for a thick layer of powder to be completely wetted throughout its thickness although there must be a contiguous single-particle layer that is completely wetted throughout its area. As a precaution, the selected material may first be cleaned, e.g., with boiling water, to remove any oil or other undesirable contaminant on the particles.

As a practical matter, water would be one of the best liquids for filling the interstices of the powder layer because it is inexpensive, abundant, readily available, and fortunately, has a higher surface tension than that of numerous liquids such as alcohols. Sea water and salt solutions may be advantageously used because salts generally increase the surface tension of water. For example, an aqueous solution of calcium chloride has a surface tension of 95 dynes per cm while the surface tension of water is 73 dynes per cm, both measured at the same temperature. Moreover, salt solutions have lower freezing points than that of water.

The wet powder seal of this invention generally is held in place by layers of coarser particles on the opposite sides of the wet powder layer. Such coarser particles may be pebbles, crushed stone, broken glass, and pieces of bricks and concrete from demolished buildings, roadways, etc. The layers of coarser particles in contact with the wet powder layer will be preferably formed of particles only slightly larger than the particles of the wet powder layer to prevent the latter particles from migrating into the interstices of the layers of coarser particles. In turn, these layers of coarser particles often will desirably be in contact with layers of still coarser particles so that the first-mentioned coarser particles will not move away from the wet powder layer as by falling through a crack in a buried gas main.

The sealing capacity of the wet powder layer has up to this point been discussed solely in terms of the maximum gas pressure differential attained when one side of the wet layer is in contact with the confined gas and the opposite side is exposed to the atmosphere. However, a preferred embodiment of the invention involves flooding the ground above the wet layer so that its sealing capacity is substantially augmented by the hydrostatic head of water established by the flooding. Thus, for example, a wet powder layer sustaining a maximum gas pressure differential equal to a water column of 70 cm will have a sealing capacity equivalent to a water column of 370 cm when the wet powder layer is under 3 meters of water. Moreover, the thickness of the wet powder layer need only be a few percent of this 3 meter layer of water.

BRIEF DESCRIPTION OF THE DRAWINGS

The further description of the invention will refer to the accompanying drawings of which.

DESCRIPTION OF PREFERRED EMBODIMENTS

Figure 1:
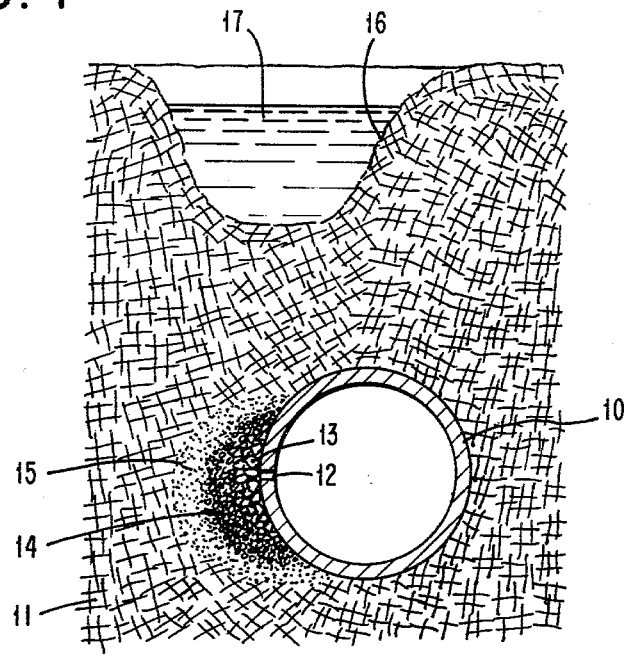
FIG. 1 is a schematic transverse section of a buried gas pipe with a leak that has been stopped pursuant to the invention.

FIG. 1 shows gas pipe 10 buried in soil 11. Lateral hole 12 in pipe 10, after having been exposed by excavation, has been sealed pursuant to this invention. A layer of pebbles 13 large enough to not fall through hole 12 surrounds hole 12 and in turn is surrounded by a layer of smaller pebbles 14 which will not fall into the interstices or voids in pebble layer 13. Sand layer 15 made up of particles passing through U.S. Sieve No. 270 completely surrounds pebble layer 14, the voids of which are too small to permit sand particles 15 to pass therethrough. As shown, soil 11 was back-filled to cover sand layer 15 and to form basin 16 in the top surface of soil 11 over sand layer 15. Water 17 fills basin 16 and permeates soil 11 and sand layer 15 to complete the wet powder seal which stops the escape of gas from hole 12 in pipe 10. The sealing capacity of wet powder layer 15 is the sum of the maximum pressure differential resulting from the selected particle size of the sand in layer 15 and the hydrostatic head measured from the highest point of the innermost surface of layer 15 to the top surface of water 17 in basin 16.

Figure 2:
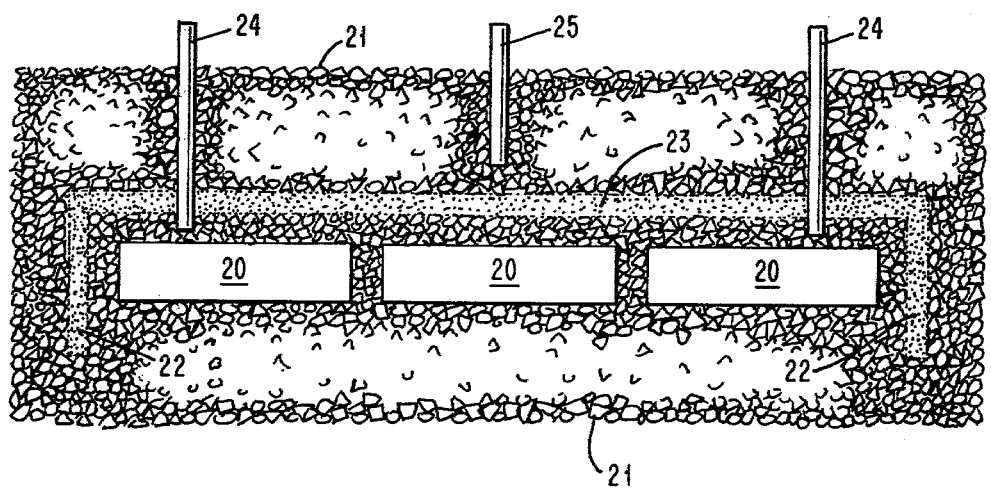
FIG. 2 is a schematic vertical section of an underground cavity for the storage of nuclear wastes constructed in accordance with this invention.

FIG. 2 is a schematic vertical section of an underground storage zone for containers 20 of nuclear waste. Containers 20 are shown buried in a porous pebbly terraine 21. The side walls of the storage zone are formed by filling a narrow trench 22 with very fine sand. While the pebbly soil 21 fills the spaces between containers 20 and covers containers 20, a layer 23 of very fine sand extends over the entire storage zone and connects with the upper end of trench 22 which is the continuous perimeter of the zone. Thus, side walls 22 and layer 23 acting as the roof of the storage zone form an inverted shell over and around containers 20; this shell when wet provides the wet powder seal of this invention to confine the atmosphere within the storage zone. Fine sand layer 23 is shown covered by pebbly soil 21 to hold layer 23 in place and prevent any major disturbance thereof. (Disturbances can be tolerated provided that they are not of such a magnitude as to shear open or tear apart the find sand layer (22 and 23); its shape and configuration may be altered by the disturbance with no ill effect provided that it remains contiguous.) Two pipes 24 extend from above the ground surface vertically down through sand layer 23 into the storage zone.

After walls 22 and layer 23 have been wet to develop the maximum gas pressure differential inherent for the fine sand used therein, e.g., a pressure differential equal to a water column of 96 cm, air is injected through one or both pipes 24 into the storage zone under the wet powder seal (layer 23 together with walls 22). The pressure of the air in the storage zone is raised to a value somewhat less than the maximum gas pressure differential of the wet powder seal to prevent pushing the water out of the interstices of the wet powder seal, it being understood that in this example the height of the trench 22 is greater than 96 cm to prevent air from escaping underneath the trench.

Preferably, water is then used to permeate pebbly soil 21 over and around the wet powder seal and establish a desired hydrostatic head in addition to the gas pressure differential of the wet powder seal. The pressure of the air in the storage zone is increased commensurately with the hydrostatic head over fine sand layer 23. The hydrostatic head over layer 23 may, as desired, be made to extend upwardly to a level below the surface of pebbly terraine 21 or to that surface or even above that surface by creating a pond or lake over terraine 21. When the desired hydrostatic head is to be maintained below the surface of terraine 21, pipe 25 extending downwardly through terraine 21 with its lower end at the approximate upper level of the water providing the hydrostatic head over sand layer 23 may be used to supply water as and when needed.

While one pipe 24 is adequate for injecting air under pressure into the storage zone, two pipes 24 have been shown in FIG. 2 to permit the continuous or periodic circulation of air through the storage zone. Thus, air may be introduced in the storage zone by one pipe 24 and withdrawn by the other pipe 24 to monitor the withdrawn air for possible contamination which would indicate that a container in the storage zone is no longer impervious to radioactivity and needs to be replaced. The circulation of air through the storage zone using two pipes 24 also makes it possible to maintain a low relative humidity in that zone.

The underground cavity for the storage of nuclear waste containers 20 depicted in FIG. 2 is basically also useful as a gas reservoir, e.g., for methane, hydrogen, synthetic fuel gas, etc. In such case, waste containers 20 are replaced with discarded broken sewer mains, cinder blocks and other non-rotting debris of large pieces so that the zone filled with such debris has large voids through which gas can readily flow. The cavity or zone formed by fine sand walls 22 and layer 23 is filled with gas through one or both pipes 24. When the gas is needed, it is simply withdrawn from the reservoir through either or both of pipes 24. Of course, as gas is withdrawn from the reservoir, water will seep up through porous bottom of the reservoir because of the hydrostatic head of the water above and surrounding the reservoir or cavity. However, when a new supply of gas is injected into the reservoir through pipe 24, the water which previously rose within the cavity will be forced to move down through the porous bottom so that the voids of the debris mass within the cavity will again be filled with gas. It is desirable to use a pipe like pipe 24 but with its lower end near the bottom of the cavity, i.e., near the level of the bottom end of fine sand wall 22. Such pipe can be used to draw water from the reservoir when a new supply of gas is being injected through pipe 24 at a rate faster than water can seep down through porous terraine 21. Likewise, such pipe can be used to introduce water into the reservoir when gas is being withdrawn at a faster rate than water can seep into the reservoir from the underlying porous terraine 21.

The underground cavity shown in FIG. 2 for storing containers of nuclear waste, which is readily adapted for storing gas, can be inexpensively and advantageously constructed in areas that have undergone strip mining. Such areas which are usually unattractive and have a loose, porous soil can be easily converted in accordance with this invention into underground gas reservoirs or cavities for storing containers of nuclear or other dangerous wastes, and covered by beautifying recreational lakes.

An important and valuable application of the wet powder seal is the stopping of leaks in irradiation apparatus or in a gas pipe connected to a nuclear reactor where the radiation level is too high for workmen to go near the leak to make repairs. In fact, the wet powder seal was conceived and successfully applied to stop a leak in an 8-inch diameter flange of an irradiation chamber. Glass-shot, passing through U.S. Sieve No. 70 and retained on Sieve No. 270, was dropped through a 12-meter long funnel over and around the leaky flange; the bottom end of the funnel was used to rake the glass-shot level. Lead bricks were lowered with stainless steel cables and carefully positioned to cover the surface of the glass-shot layer uniformly with gaps of about 1 cm between bricks. The gaps were filled with 0.6 cm diameter stainless steel balls which were further immobilized by pouring glass-shot from the funnel into the voids between balls and bricks. The lead bricks and steel balls were used to hold the glass-shot layer over the faulty flange in place and prevent it from rising like a piston when the irradiation chamber was subsequently pressurized with helium. Of course, before pressurizing the chamber, water was poured on the glass-shot layer both to fill the interstices and to cover the layer. When the irradiation chamber was pressurized with helium, the wet glass-shot layer proved to be an effective gas seal for the previously leaking flange. Hence, to repeat, a feature of the wet powder seal of this invention is that it can be applied to stop leaks in inaccessible and dangerous places by using remote control means to install the wet powder seal.

The successful containment of gas under pressure by the wet powder seal required attention to necessary but simple details. The powder selected for the seal layer must be readily wetted by the seal liquid. The particles in the powder seal should be well compacted. One way of forming a compact layer without tamping is to drop the powder in the liquid, usually water, and allow the particles to settle out. The powder layer thus formed obviously has it capillaries filled with liquid and, therefore, is the wet powder seal of this invention. For most cases, substantially all of the powder selected for the seal will pass through U.S. Sieve No. 100 and, as previously pointed out, the finer the particle size of the powder, the greater will be the sealing capacity of the wet powder layer. In practice, the wet powder layer is designed to resist the passage therethrough of gas at a pressure of at least a 20 cm column of water. It is important to keep the pressure of the gas confined by the wet powder seal from increasing to the point where the liquid is pushed out of the capillary spaces or voids in the wet powder seal. When the liquid is pushed out of the capillary spaces in the powder seal, not only will the confined gas escape but also it may be difficult to get the liquid to refill those capillary spaces even after the gas pressure has dropped well below the maximum sealing pressure for which the wet powder seal was originally designed.

Variations of the invention will be apparent to those skilled in the art. For instance, a new gas main may be laid in a trench with a layer of gravel adjacent the exterior surface of the main and with fine sand completely encasing the gravel layer. In an area where ground water will keep the fine sand wet, the new gas main will be encased in a wet powder seal ready to stop any leak that may develop. The gravel layer in contact with the main is a precautionary barrier to stop the fine sand from falling into the main in the event that a hole or crack larger than the sand particles develops. Accordingly, only such limitations should be imposed on the scope of the invention as are set forth in the appended claims.

What is claimed is:

1. A method for providing a gas seal over at least part of the surface area of a structure containing a gas, said method comprising the steps of:
    (a) providing a compact, contiguous layer of particles over the area to be sealed, said layer being positioned so that any gas escaping through openings in the area to be sealed will flow to said compact layer;
    (b) providing means for maintaining said compact layer in place, said means functioning both to prevent disruption of said compact layer due to gas pressure and to prevent passage of the particles of said layer through openings in the area to be sealed; and,
    (c) maintaining a liquid in all of the intersticies of at least one contiguous single particle layer within said compact layer, said liquid being chosen so that the particles of said compact layer are wettable by, and insoluble in, said liquid, whereby the passage of gas through the intersticies of said single particle layer is resisted by capillary action on the liquid in the intersticies.

2. The method of claim 1 wherein said compact layer is at least about 10 cm thick.

3. The method of claim 1 wherein the liquid is water or an aqueous salt solution having a surface tension greater than that of water.

4. The method of claim 3 wherein substantially all of the insoluble powder will pass through U.S. Sieve No. 100.

5. The method of claim 1 wherein the wet powder layer is disposed under a body of water which increases the sealing capacity of said powder layer by the hydrostatic head of said body of water.

6. The method of claim 1 wherein the means of subparagraph (b) comprises a layer of particles larger than the particles of said compact layer in contact with at least one of the opposite sides of said compact layer, said layer of larger particles having intersticies small enough to prevent the passage therethrough of the particles of said compact layer.

7. A structure capable of containing gas comprising:
    (a) a compact contiguous layer of particles, said compact layer being concaved downwards and defining a storage volume;
    (b) fill within said volume for supporting the said compact layer, said fill having a substantial void space fraction so as to provide void space within said storage volume for containing gas;
    (c) means for maintaining said compact layer in place, said means functioning both to prevent disruption of said compact layer due to gas pressure, and to prevent passage of the particles of said compact layer into the void space of said fill; and
    (d) a liquid filling all the intersticies of at least one contiguous single particle layer within said compact layer, said liquid being chosen so that particles of said compact layer are wettable by, and insoluble in, said liquid, whereby passage of gas through said intersticies is resisted by capillary action on the liquid in the intersticies.

8. The structure of claim 7 which is used as a reservoir for a gas and is provided with at least one pipe for introducing into and withdrawing from said cavity said gas.

9. The structure of claim 7 wherein containers of dangerous wastes are stored and which is provided with at least one pipe for introducing air into said cavity and at least one pipe for withdrawing said air from said cavity.

10. The structure of claim 7 wherein the wet powder layer is disposed under a body of water which increases the sealing capacity of said powder layer by the hydrostatic head of said body of water.

* * * * *